March 8, 1966  H. R. DAY, JR  3,238,839
OPTICAL THICKNESS GAUGE
Filed March 29, 1962  3 Sheets-Sheet 2

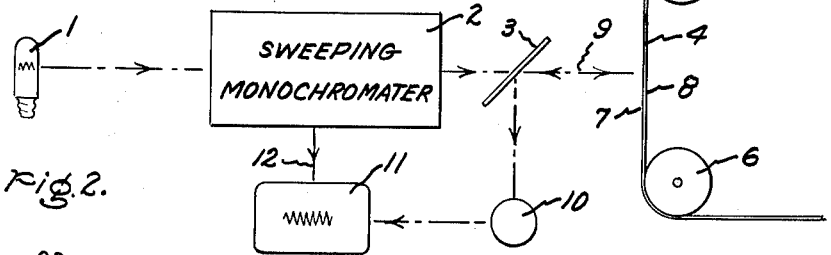
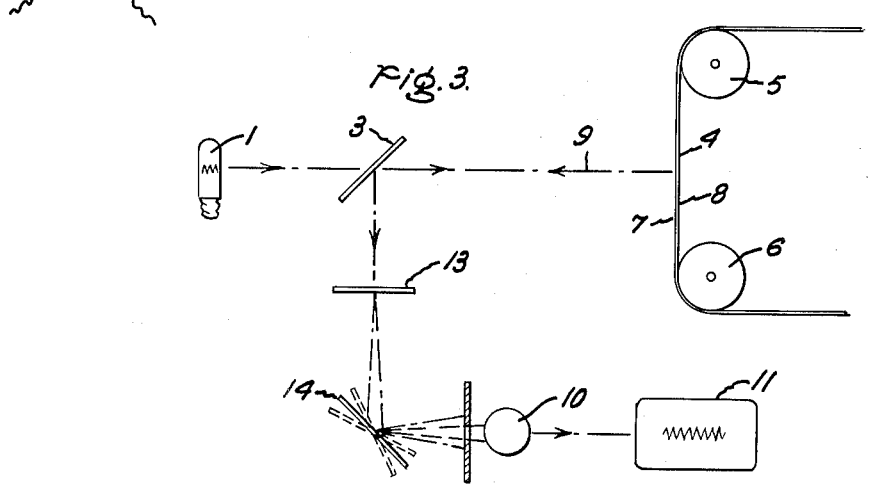
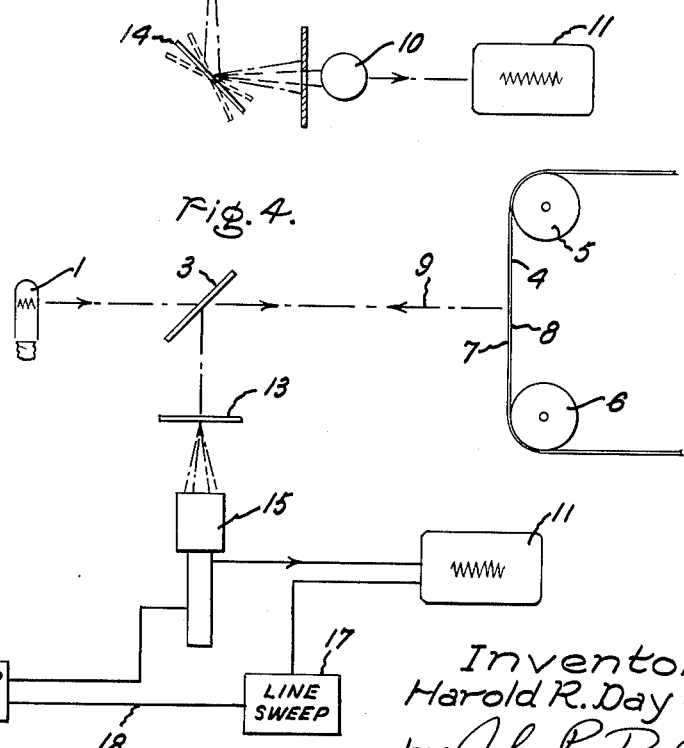

Inventor:
Harold R. Day Jr.,
by John P. Dollitt
His Attorney.

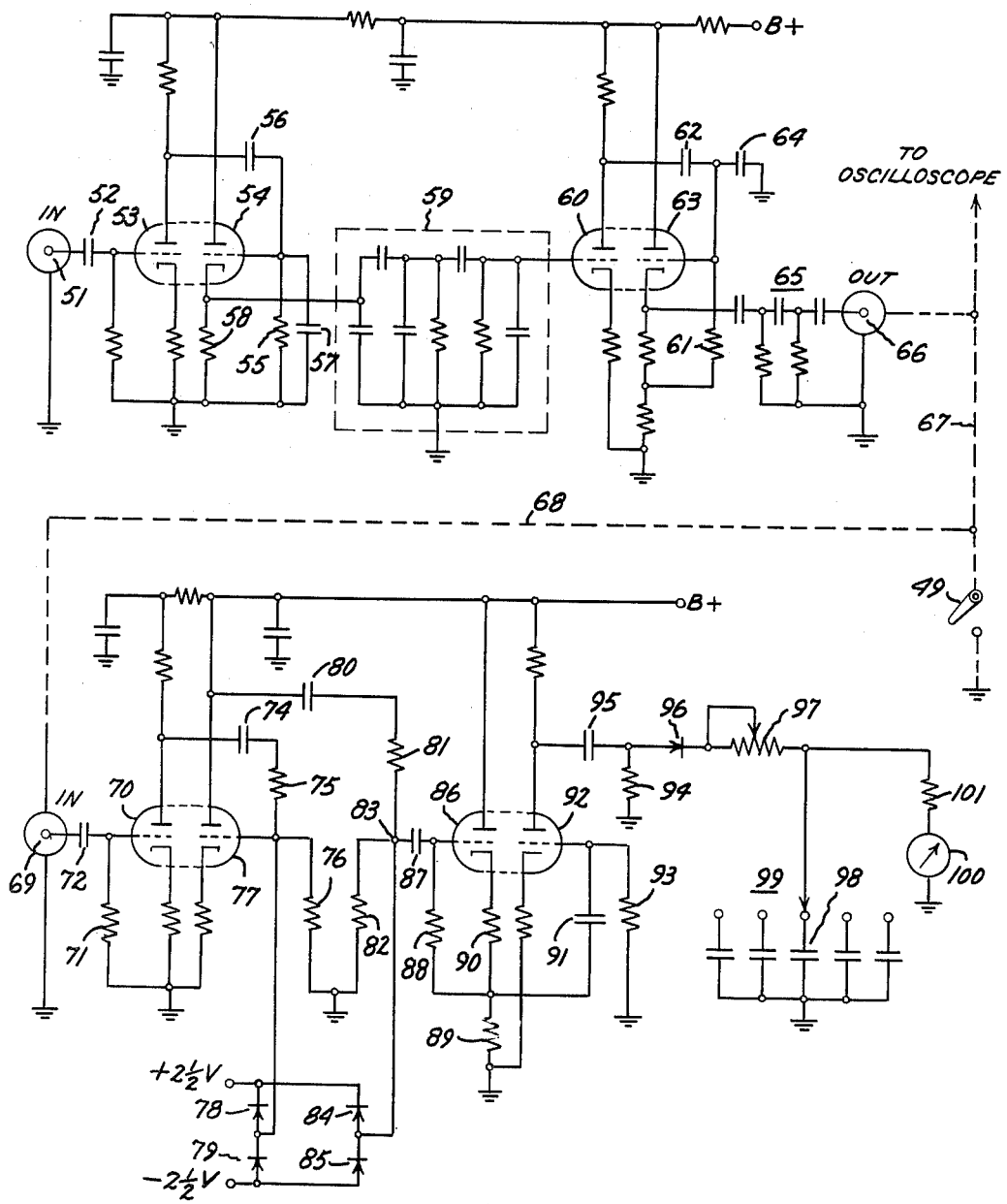

United States Patent Office 3,238,839
Patented Mar. 8, 1966

3,238,839
OPTICAL THICKNESS GAUGE
Harold R. Day, Jr., Burnt Hills, N.Y., assignor to General Electric Company, a corporation of New York
Filed Mar. 29, 1962, Ser. No. 183,438
12 Claims. (Cl. 88—14)

This invention relates to an apparatus for measuring distance and more particularly to apparatus for electronically measuring the thickness of a thin moving transparent member.

The apparatus of the present invention contemplates measuring the thickness of a thin transparent tape or the like with a beam of light, therefore obviating the necessity of physically contacting the material.

In the copending application of William E. Glenn, Jr., Serial Number 8,842, filed February 15, 1960, a continuation-in-part of application Serial Number 698,167, filed November 27, 1957 (now abandoned) and of application Serial Number 783,584, filed December 29, 1958 (now abandoned), all assigned to the assignee of the present invention there is set forth and claimed a thermoplastic tape material including a thermoplastic surface layer for receiving recorded information as tape surface undulations. Patent No. 3,113,179 was granted December 3, 1963, on said application Serial No. 8,842, and Patent No. 3,147,062, entitled Medium for Recording, was granted September 1, 1964, on application Serial No. 84,424, filed January 23, 1961, as a division of said application Serial No. 8,842. Such information may be "inscribed" on the medium with an electron beam, forming for example, a television raster of deposited charge upon the thermoplastic layer. The thermoplastic is then heated, whereupon area of maximum charge density are drawn towards a conductive layer on the back of the thermoplastic layer, thereby forming undulations in the thermoplastic.

By properly modulating the writing electron beam with a high frequency signal, it is possible to establish undulations in the form of closely spaced diffraction grating lines wherein the grating lines are substantially perpendicular to the electron beam tracing direction. Information thus inscribed on the tape may be projected in an optical system including a source of light and a bar masking system. The masking system in such an arrangement is positioned to intercept non-diffracted light, whereby only intelligence from the diffraction grating on the tape passes the masking system to form the projected image on a screen.

It is quite important in the manufacture of this tape to form a thermoplastic layer with a uniform thickness between the top surface of the thermoplastic and a transparent conductive backing. If the thermoplastic layer is too thick, the surface potential may become too high for producing satisfactory recording definition. On the other hand, film flow viscosity of the thermoplastic (when heated for establishing the undulations) is too high if the film is too thin. Variations in thickness result in uneven recording and blotchiness. Optimum film sensitivity results with a film thickness between 6 and 12 microns, if the diffraction grating spacing is approximately 16 microns, for example.

Various methods are available for measuring the thickness of thin members. One is the ordinary micrometer technique which may be used for spot checking tape thickness; however, such a procedure unfortunately tends to mar the thin thermoplastic material and therefore a means of measuring such thickness without physically engaging the tape is more desirable. Moreover the thickness of tape as manufactured cannot be conveniently measured in this way.

A known non-contacting method of measuring a thickness of a transparent member involves illumination of a transparent member with a beam of light for producing interference bands. These bands result from light reinforcement and cancellation caused by light reflected from the front and back surfaces of the transparent member. Such an interferometer technique is useful in the laboratory for measuring the depths of thin films and can be used to measure the thickness of a stationary sample of a thermoplastic tape layer. However, the procedure is tedious and involves recognizing the identity of the various ambiguous interference bands. Then such bands must be counted to determine the thickness. Such a method again does not provide continuous, on-line, production monitoring of the tape thickness whereby imperfections or thickness variations may be instantly detected. Nor can such an occasional inspection control the manufacture of tape to automatically control tape thickness.

It is accordingly an object of the present invention to provide an improved apparatus, for continuously and unambiguously measuring and displaying the distance between a pair of surfaces.

It is another object to provide improved electro-optical apparatus for determining and indicating the thickness of a thin transparent member, for example, a moving member.

In accordance with an embodiment of the present invention, a light beam is directed through the transparent member to be measured, for example a moving tape. Light from the surfaces of the transparent member is received with a light sensitive transducer or receptor where light reinforcements and cancellations from the two surfaces are translated to electrical signals.

A light frequency varying means in the light path continuously varies or sweeps through the light frequencies arriving at the light sensitive receptor.

The variation in light frequency may be produced with a light source capable of frequency variation, or with a frequency varying member inserted in the light path between the light source and the light receptor. Such a frequency varying member may, for example, comprise a diffraction grating which produces light spectra in response to illumination with white light. The optical system is then arranged to accept one color after another as the spectrum is swept. This spectral variation is continuously repeated such that the colored light reaching the receptor continuously oscillates.

A light interference band pattern as such is not utilized for determining the thickness of the transparent member; rather the light derived from the front and back surfaces of the tape combines to produce reinforcement at certain frequencies and cancellation at other frequencies as the light reaching the receptor varies in frequency with time.

The reinforcements are then displayed, in accordance with one embodiment, on an oscilloscope whose sweep is synchronized with the light frequency variation, or such reinforcements are gauged electronically on a meter to provide a direct and continuous numerical measure of thickness.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a schematic diagram of an embodiment of the present invention;

FIG. 2 is an oscilloscopic trace representing light reinforcements and cancellations at various light frequencies;

FIG. 3 is a schematic representation of another embodiment of the present invention;

FIG. 4 is a schematic diagram of yet another embodiment of the present invention;

FIG. 6 is a circuit diagram of amplification and metering equipment in accordance with the present invention.

Figure 5:
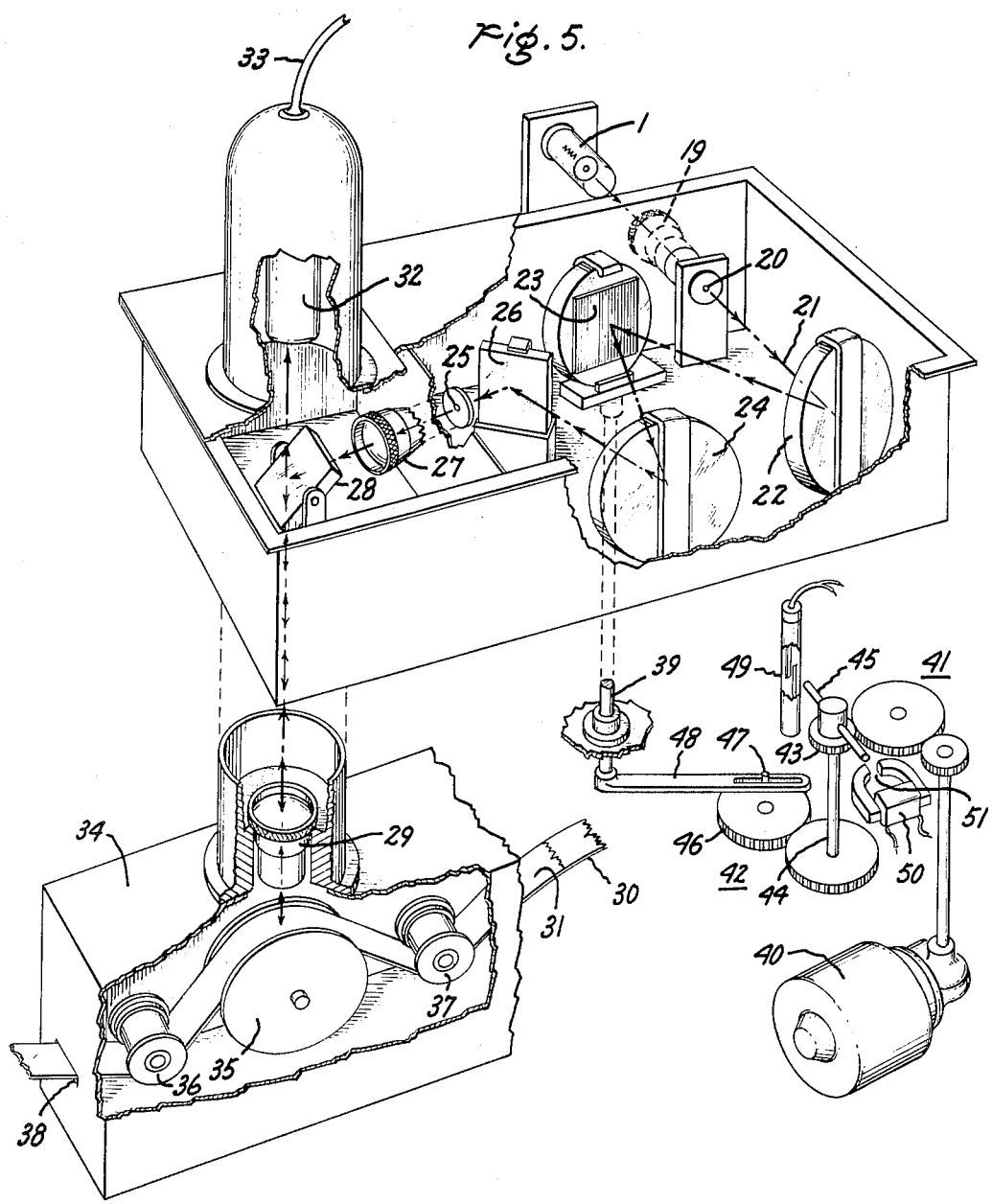
FIG. 5 is a cutaway perspective illustrating the mechanical details of the FIG. 1 type of embodiment.

Referring to FIG. 1, a source of white light 1 is directed towards a sweeping monochromator 2 whose function it is to pass a relatively monochromatic, e.g. single color, beam of light in a periodically changing sequence. The monochromator continuously changes the light frequency it transmits from a low, or red, light frequency to a high, or blue, frequency and back again in a repeating sequence. Such device may include a prism or diffraction grating for breaking up the light from source 1 into a light spectrum and may further include means for selecting substantially one color of the spectrum and varying this color with time. Alternatively a frequency varying light source may be used.

The monochromatic light passed by monochromator 2 is directed through a partially or "half silvered" mirror 3 to a transparent tape member 4 which rapidly passes between pulleys 5 and 6. The light is preferably normally incident upon tape 4 and is reflected substantially perpendicularly from both front and back surfaces 7 and 8 of the tape (or of a tape coating), in a light path 9 back towards half silvered mirror 3. The light from the front and back surfaces of the tape is reflected by mirror 3 onto a light sensitive receptor 10, e.g. a photocell. The receptor which may be a photocell provides an electrical output indicative of the light intensity incident thereon which output is coupled to oscilloscope 11.

The oscilloscope is triggered in its sweep operation from left to right in synchronization with the sweeping monochromator. This synchronization is designated by connection 12 between the monochromator and the oscilloscope. The sweep of the oscilloscope proceeding from left to right, always starts out at the time when the sweeping monochromator passes a given light frequency through the tape. Then as the light frequency incident on the tape is continuously changed from a low frequency to a high frequency, the oscilloscope trace proceeds from its left terminus to its right terminus. The light intensity information from the light receptor 10 is applied to the vertical oscilloscope deflection system resulting in a pattern as illustrated in FIG. 2. The thickness of the tape is measured by the number of light reinforcements, i.e. the number of depicted peaks on the FIG. 2 trace.

The output of the monochromator incident upon the tape 4 undergoes "interference" because of the reflection from the front and back surfaces thereof. Destructively interfering wavelengths tend to cancel and the constructively interfering wavelengths tend to return to the light receptor 10. Since the wavelength of light striking the receptor varies in time, the output of the receptor is readily displayed on oscilloscope 11 as indicated. If $\lambda_2$ and $\lambda_1$ are upper and lower light wavelength limits, respectively, for the sweeping monochromator, as seen on the oscilloscope, the following formula indicates, to practical accuracy, the distance between the two surfaces of the tape in terms of the number of peaks or bumps in the FIG. 2 pattern:

$$d = \frac{N\lambda_1\lambda_2}{2n(\lambda_2 - \lambda_1)\cos\theta} \quad (1)$$

In this formula,

N is the number of periods between peaks in the FIG. 2 curve,
$\cos\theta = 1$ (for normal incidence),
$n$ = the index of refraction for the tape material 4, and
$d$ = the thickness of the tape in the units that were used for $\lambda$.

It is thus apparent that a continuous and unambiguous oscillographic pattern may be produced electronically in accordance with the present invention, which oscillographic pattern can be observed remotely for control of the continuous production of thin tape films and the like. In the example mentioned, that of thermoplastic film production, the thickness of a thin film thermoplastic coating on a heavier base film is continuously monitored as the coating is applied to the base film. In a particular instance the coating is held between 6½ and 7½ microns in depth. As seen from the preceding formula, the thickness in microns for a particular coating, e.g. polystyrene ($n = 1.6$), is on the order of ⅔ N where N is the number of periods on the oscilloscope curve. This measure is accurate for an oscilloscope pattern confined between light frequencies of 0.435 and 0.546 micron. Therefore, if 10 periods appear on the FIG. 2 curve, a tape thickness of six and two-thirds microns is indicated. A constant or nearly constant number of peaks on the oscilloscope trace will indicate to the operator uniform thickness in the production of the polystyrene layer, whereas a changing pattern will indicate a non-uniform thickness of tape. The trace is unambiguous, being confined to a definite frequency range, as will hereinafter more fully appear.

The number of peaks or cycles, thus electronically generated, may be counted electronically or presented as a gauge reading as hereinafter more fully described, or the signal may be used for the control of the tape manufacture or coating process itself.

The embodiments of FIGURES 3 and 4 are substantially similar to FIG. 1 regarding like elements designated by like reference numerals. Hence FIGURES 3 and 4 will be described in particular connection with the major differences. In the embodiment of FIG. 3, a sweeping monochromator means is disposed between the light reflecting surfaces of tape 4 and the light sensitive receptor 10. This light frequency changing means includes a diffraction grating 13 and an oscillating mirror 14. In this embodiment, white light from source 1 passes through half silvered mirror 3 to the tape 4 which produces surface reflections directed perpendicularly back to mirror 3. The half silvered mirror further reflects this return beam through diffraction grating 13 wherein the return beam is divided into a light spectrum. Mirror 14 oscillates or rocks in a manner to direct a single color or a short band of color toward the light sensitive receptor 10, through the receptor diaphragm, at any one time. The light receptor produces an electrical signal for oscilloscope 11 indicative of the light reinforcements at the various light frequencies reaching receptor 10, whereby a pattern of the FIG. 2 type is produced by the oscilloscope 11. The tracing of oscilloscope 11 may be synchronized by means including circuitry internal to oscilloscope to start when mirror 14 is near one extreme of its rotation so that the trace across the oscilloscope proceeds as the mirror rocks towards its other extreme. The oscilloscope synchronization signal may be derived from the mechanical movement (not shown) employed for rocking mirror 14, or internally from the signal.

In the FIG. 4 embodiment, mechanical movement is eliminated by employing the optical viewing capabilities of a television type camera tube 15. The arrangement, otherwise similar to the FIG. 3 embodiment, has camera tube 15 positioned such that the spectrum produced by diffraction grating 13 falls across its face. A raster sweeping apparatus 16 moves the electron beam of camera tube 15 in a raster-like sweep which periodically scans the spectrum in a continuous manner from its low color frequency end to its high color frequency end or vice versa. An oscilloscope 11 receives a video output from camera tube 15 on the oscilloscope's vertical deflection apparatus and produces a FIG. 2 type characterization of the light reinforcements from tape 4. The horizontal line sweep circuit 17 of the oscilloscope is synchronized with raster sweep means 16 so that a single trace is produced by the oscilloscope for each raster sweep of the camera tube. Actually, it is convenient to employ the camera tube vertical sweep signal directly for the horizontal sweep input to oscilloscope 11. The interconnection is indicated by line 18 in the drawing.

FIG. 5 illustrates in greater detail an embodiment of the FIG. 1 type. Like FIG. 1, the sweeping monochromator means, e.g. an oscillating diffraction grating, is located between the source of light and the film whose thickness is to be measured. In the FIG. 5 embodiment a direct-current operated zirconium vapor lamp 1 having a white hot cathode is imaged by lens system 19 on a small "pinhole" aperture 20 providing a light beam in accordance with the present invention. The beam 21 is directed towards a first spherical mirror 22 where the light from the pinhole 20 is converted into parallel rays for illuminating a reflecting diffraction grating 23. Diffraction grating 23 has grating lines disposed vertically such that a spectrum of spread colors is produced in a horizontal plane in the drawing, i.e. about its rocking axis. This light, constituting first order diffracted light from grating 23, is concentrated by spherical mirror 24 on a second pinhole aperture 25, via flat reflecting mirror 26. The light consists of a line spectrum or series of images of pinhole 20 for different colors. It should be observed at this point, that for a given position of grating 23, substantially only one color or a very narrow band of color will pass through aperture 25.

This monochromatic light passing through aperture 25 is converted into parallel light by lens system 27 and is reflected by half silvered mirror 28 through lens system 29 where the light is brought to focus on moving tape 30 carrying a thin film or coating 31 on the top thereof, and a very thin metal layer between the film coating and the underlying base tape. The front and back surfaces of the thin film coating 31 reflect the light perpendicularly back through lens system 29 and mirror 28 to illuminate photocell or multiplier tube 32 with the reflected light from the tape.

If the frequency of light cast upon the tape is of a frequency such that an odd number of half wave lengths exist in the path the light travels from the front to the rear surface of the film and back again, light cancellation will result and a relatively low electrical signal is produced at photomultiplier output 33. If, on the other hand, the light path through the coating and back is an even number of half wave lengths at the frequency of light passing through the system, the light reflected from the front and back surfaces of the film coating will provide a relatively large output at photomultiplier output 33.

Film 30 moving on a manufacturing production line, just having received the coating 31, is passed through a light excluding enclosure 34 and over the top of a spool 35 whose periphery is located to intersect the focal point of lens system 29. A pair of guide pulleys 36 and 37 act to direct the tape into and out of enclosure 34. The tape also passes through a small entrance 38 and a similar exit in enclosure 34 and the inside of enclosure 34 is blackened to prevent entrance of extraneous light. Enclosure 34 including the housing for lens system 29 is shown broken away from the rest of the apparatus for illustrative purposes. It is understood such housing communicates between enclosure 34 and the main enclosure of the apparatus for light exclusion purposes.

As noted, light reinforcements are produced by the reflections from film 31 at some light frequencies and cancellations result at other light frequencies, producing an analogous variation in the electrical output 33 of photomultiplier 32. Reflecting diffraction grating 23 is oscillated or rocked back and forth so that the light frequency reaching the film 31 varies continuously in frequency from red to blue, then blue back to red, etc., passing through all the intermediate range of colors. To produce the rocking of reflecting grating 23, reflecting grating 23 is mounted for horizontal rotation on a shaft 39 shown broken away as a matter of illustrative convenience. The shaft 39 is imparted motion by drive motor 40 including a gear motor whose rotational output is provided to a first gear train 41 communicating with a second gear train 42. Intermediate gear 43 is carried on a shaft 44 which in turn has mounted thereon a bar magnet 45 used for synchronization purposes as hereinafter set forth.

Gear train 42 includes an output gear 46 carrying a crank pin 47 riding in the slot of slotted follower arm 48. Follower arm 48 is mounted on the shaft 39 upon which the reflecting diffraction grating 23 is mounted.

The motor 40 operates through the gear trains 41 and 42 to rotate gear 46 carrying the crank pin 47. As the gear 46 rotates, the pin 47 imparts oscillating motion to the end of follower arm 48, driving shaft 39 through a short, back and forth, rotational movement. This movement is arranged to cause reflecting grating 23 to reflect a spectrum across aperture 25 by way of the intervening mirrors. As therefore appears, the frequency of light reaching the tape 30 in enclosure 24 is varied continuously back and forth through the spectrum as motor 40 rotates. Therefore the output lead 33 will be an electrical signal analagous to the FIG. 2 wave form and, properly amplified, may be applied to the vertical deflection system of an oscilloscope. The drive is conveniently arranged to rock the mirror five times a second, this motion providing adequate repetition for continuous viewing on an oscilloscope taking into account usual cathode ray tube phosphors and persistence of vision.

A magnetically operated switch with mercury wetted contacts 49 is positioned near the end of bar magnet 45. As bar magnet 45 rotates with shaft 44 these contacts close as one or both ends of bar magnet 45 pass in close proximity thereto. This switch may then be connected to start an oscilloscope trace each time magnet 45 rotates past switch 49.

The period of closure of the contacts of switch 49 is adjustable in conjunction with the position of the switch so the contacts close and open at selected light frequencies in the light system. The bar magnet 45 extends sufficiently on either side of shaft 44 to operate switch 49 twice during each rotation of shaft 44, magnet 45 executing one rotation for each complete back and forth oscillation of reflecting grating 23. The switch 49 may be connected in the system for shorting out the signal input to the vertical deflection system of an oscilloscope, whereby a short portion of light frequency at either end of the spectrum is deleted from the oscilloscopic trace. This is desirable since, for the extremely short wave lengths and extremely long wave lengths, the peaks on the trace as illustrated in FIG. 2 become closer together and it is therefore desirable to eliminate the extreme ends of the spectrum from consideration. To achieve this result, switch 49 is simply connected in an input amplifier for shorting out the oscilloscope input for selected periods as magnet 45 moves past the switch. Magnet 45 is rotationally positioned on shaft 44 at an angle corresponding to the extreme position of the reflecting diffraction grating as shown in FIG. 5.

If desired, the light wavelengths thus eliminated may be calibrated with the aid of light filters, e.g., interference filters or narrow band transmission filters placed between lens system 19 and aperture 20 or elsewhere in the light path. The positioning of switch 49 relative to magnet 45 is then determined such that the desired electrically transmitted spectrum is just short of being shunted out by switch 49. This same adjustment can be made with a standard frequency light source or sources used in conjunction with light source 1. After the initial adjustment of the switch arrangement, the transmission filters or the additional light source may be dispensed with. The preset $\lambda_1$ and $\lambda_2$ are then the wavelengths in Formula 1 between which switch 49 operates.

As will be observed, the rocking mirror first produces a spectrum moving in one direction, e.g. from red to blue, through yellow, green, and intermediate colors, and then a spectrum having the reverse motion. If desired the oscilloscope trace is adjusted to execute a trace coincident with color frequency sweep only in one direction, that is the oscilloscope may be rendered inactive during every other spectrum sweep. For such a sweep schedule it is convenient to arrange a magnetic reading head 50 near the path of bar magnet 45 whose output is connected to synchronize the oscilloscope in the usual manner appreciated by those skilled in the art. Since this magnetic reading head will be sensitive to the polarity of the end of the magnet passing by its gap 51, its output may be used to drive a polarity sensitive horizontal synchronization amplifier of the oscilloscope.

For some purposes the internal synchronization or signal synchronization of the oscilloscope will start the trace of oscilloscope each time contacts of the switch 49 opens to allow the signal from photomultiplier output leads 33 to reach the oscilloscope vertical deflection system.

FIG. 6 is a schematic diagram of an amplifier circuit receiving its input from photomultiplier 32 and which may then provide a suitably amplified output for an oscilloscope or the like. The circuit also includes metering or gauging means for reading thickness directly.

The amplifier input terminal 51 is coupled by capacitor 52 to the grid of the first amplifier tube 53. This amplifier drives second amplifier 54 through an intermediate RC coupling 55–56. Resistor 55 is shunted by a small capacitance 57 for limiting the high frequency "hash" in the signal. Amplifier 54 is a cathode follower stage having its cathode resistor 58 coupled to band pass filter 59. Band pass filter 59 is designed to pass a frequency band between 60 and 500 cycles. The desired signal from the photomultiplier has a frequency of approximately 100 cycles per second and it is desired to throw away high frequency noise as well as the 5–10 cycle rocking frequency. As observed from the wave form of FIG. 2, the electrical signal produced has a tendency to rise during the middle of the color frequency spectrum and then drop near each end. Band pass filter 59 operates to level out the resulting signal so the waveform varies about a zero axis, such as pictorially illustrated at the schematic representation of oscilloscope 11.

The output of filter 59 drives the grid of amplifier tube 60 whose plate is coupled via RC coupling network 61–62 to the grid of cathode follower amplifier tube 63. Again a small high frequency shunting capacitor at 64 returns the grid 63 to ground. Tube 63 provides a cathode follower output to a high pass filter 65 arranged for further reducing the 5 to 10 cycle rocking frequency and its output is taken at terminal 66. Terminal 66 may be connected directly to the vertical deflection amplifier of an oscilloscope as shown by connection 67. Switch 49 operated by the grating oscillating mechanism shunts this output to ground at the desired predetermined light wavelength limits, i.e. $\lambda_1$ and $\lambda_2$. As also previously noted, such an arrangement will internally synchronize the oscilloscope if so desired.

According to a feature of the present invention, the light reinforcements, converted to a continuous electrical form provide a continuous meter reading indicative of the thickness of the film coating, thereby establishing a simple and readable production line control and one easily employed as a signal for production control servo mechanism systems and the like (not shown). For this purpose the output of filter 65 via output terminal 66 in FIG. 6 is conveyed by way of conductor 68 to input terminal 69 of a second amplifier section. Terminal 69 drives amplifier tube 70 through capacitor 72 and tube 70 in turn provides an input via its anode and RC coupling 74–75–76 to the grid of amplifier tube 77. The grid of amplifier tube 77 has connected thereto a pair of clipping diodes 78 and 79 poled to clip the grid signal between plus 2½ volts and a minus 2½ volts, to which voltages the aforementioned diodes 78 and 79 are connected. The signal passed is a square wave version of the FIG. 2 oscillation.

Tube 77 is further coupled via coupling network 80–81–82 to a point 83 where further clipping is applied by means of diodes 84 and 85 connected thereto. These diodes are respectively poled to clip the signal between a plus 2½ volts and a minus 2½ volts and are accordingly connected to these voltages. Point 83 provides the signal, clipped to a "square" wave, for tube 86 via capacitor 87 and resistors 88 and 89 returned to ground. Tube 86 acts as a cathode follower and the juncture between cathode resistor 90 and resistor 89 is therefore coupled by way of capacitor 91 to the grid of tube 92. The grid of tube 92 is returned to ground with resistor 93.

Capacitor 91 and resistor 93 have values appropriate for differentiating the input signal which has been clipped to a square wave. The anode of tube 92 is connected to resistor 94 through coupling capacitor 95 and the voltage established there will be observed to be a leveled, clipped, differentiated, and amplified version of the FIG. 2 type signal, including a sharp positive spike for each positive peak in the FIG. 2 signal. Diode 96 eliminates the negative spikes attendant to the formed square wave and therefore only the positive spikes are coupled through variable resistance 97 to a capacitor 98 selected with switch 99.

A voltmeter 100 is connected through resistor 101 to the movable arm of switch 99 such that it registers the charge on the selected capacitor 98. As will be appreciated by those skilled in the art, the capacitor 98 integrates the voltage delivered through diode 96, to provide a voltage for meter 100 indicative of the number of spikes accumulated on this capacitor. In this manner, the meter 100 reads the thickness of the film in accordance with a number of wave form peaks thus integrated. Variable resistance 97 is adjustable for calibrating volt meter 100 to the desired thickness scale. Alternatively the voltage at meter 100 may be employed as the input to a conventional servo control system for adjusting manufacture of the film.

Many departures from the particular embodiments will occur to those skilled in the art. For example, although a diffraction grating has been found particularly efficacious in establishing a light spectrum and continuously selecting the colors thereof, other variable light frequency means may be utilized in the light path either before or after the light is reflected from the surfaces of the transparent member. The distance measurement herein discussed is the depth thickness of a transparent member or film from which the light beam is reflected. The apparatus of the present invention is also capable, however, of measuring similar distances between two light reflecting or light passing layers or points not physically or mechanically associated in the same film or body. The light impinging on the surfaces, whose intervening distance is being measured, need not be detected by reflection on the same side of the said members as the source from whence the light originates, particularly if the members or film are transparent. In that event, the interference phenomenon may be detected with a light receptor or transducer means, e.g. a photocell or camera tube, on the opposite side of the surfaces from the light source.

From the foregoing it will be seen the present invention electronically establishes a continuous and unambiguous representation of the thickness of a transparent member or the like. This measurement is continuous and may be remotely displayed for the control of production of the said transparent member. An important feature of the invention involves continuous sweeping of the light beam through the various frequencies of the spectrum for establishing a wave form representative of the light reinforcements and cancellations through the spectrum. Various thin transparent members of various and differing thicknesses may be measured by this apparatus because an accurate and unambiguous representation of the member's thickness is consistently produced.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A thickness determining device for continuously indicating the thickness of a transparent member having two substantially flat parallel surfaces comprising a source of light the spectral frequency of which varies as detected in a periodic manner with time, a detector for receiving light forwarded by said two surfaces and generating a signal in accordance with the light received thereby, output means coupled to said detector and synchronized with the period of frequency variation of said source for receiving said signals and indicating light reinforcements and cancellations caused by said light interfering at said two surfaces during successive periods of spectral variation, the number of said reinforcements and said cancellations occurring within any one time period being indicative of the thickness of said transparent member.

2. An optical apparatus for determining the distance between a pair of approximately parallel surfaces comprising a light path including a light source for illuminating said surfaces; detecting means viewing the light from said surfaces and producing a signal in accordance with light intensity, and means in said path for periodically varying the spectral output frequency of said light in time; and output means coupled to said detecting means and responsive to the signal produced by said detecting means during discrete periods of frequency variation of said light and synchronized with the periods of frequency variation thereof for continuously indicating light reinforcements and cancellations produced by the light from said surfaces during such periods.

3. A thickness determining device for continuously indicating the thickness of a transparent member having approximately parallel front and back surfaces comprising a light source which illuminates said transparent member whereby interference of light from the front and back surfaces of said transparent member produces frequency varying reflection intensity at various frequencies in the light spectrum, a light sensitive cell positioned to receive said reflected light and producing an output signal proportional thereto, light frequency separating means interposed in the light path between said light source and said cell for delivering a cyclically varying spectral frequency of reflection to said cell, and display means coupled to receive the output of said light sensitive cell responsive to its output signal and synchronized with cycles of frequency variation of said light frequency separating means for indicating the pattern of the frequency varying intensity.

4. A thickness determining device for continuously indicating the thickness of a two surfaced transparent member the surfaces of which are approximately parallel comprising a variable spectral output light generating means delivering a light beam of cyclically varying light frequency to said transparent member; said cyclically varying frequency varying over a frequency range from a first given frequency to a second given frequency; a light sensitive receptor positioned to detect the light reflected from both surfaces of said transparent member and producing an output signal proportional to light intensity, and output means coupled to said receptor and responsive to the receptor output signal which operates in cyclical synchronism with said frequency variation for presenting a display repeating at a time said light beam attains a given frequency.

5. A thickness determining device for continuously indicating the thickness of a transparent member between two opposite approximately parallel surfaces thereof comprising a variable spectral output light generating means delivering a light beam of cyclically varying light frequency to said transparent member in a direction substantially normal thereto; a light sensitive receptor positioned to detect the light reflected from the surfaces of said transparent member, and an oscilloscopic display apparatus having a repetitive sweep operating in cyclical synchronism with the frequency of said light source, said sweep being initiated as said light attains a given frequency, said oscilloscopic means receiving as an intelligence signal the output of said receptor for display along said sweep.

6. A thickness determining device for continuously indicating the thickness of a moving transparent member having substantially parallel front and back surfaces comprising a light source for illuminating said moving transparent member, a diffraction grating receiving the light from the front and back surfaces of said moving transparent member in a first direction therefrom, oscillating means for periodically changing the angle between the light thus received and said diffraction grating, light restrictive means positioned to transmit primarily a monochromatic beam of light reflected from diffraction grating, a light sensitive transducer receiving the light transmitted from said restrictive means and producing an output signal proportional to light intensity, and detecting apparatus receiving the output of said transducer and synchronized with oscillation periods of said oscillating means, for indicating in response to the output of said transducer the reinforcements from the front and back surfaces of said moving transparent member at various spectral light frequencies during a discrete period of oscillation for said oscillating means.

7. A thickness determining device for continuously indicating the thickness of a transparent member having approximately parallel front and back surfaces comprising a light source for illuminating said transparent member, a diffraction grating receiving light from the front and back surfaces of said transparent member to provide a spectrum of colors therefrom, a television camera tube having a beam directed towards a sensitive surface disposed in a plane to receive said spectrum across said surface, sweep means tracing a raster like beam trace on the surface of said tube such that the raster proceeds across said spectrum during one raster period producing an output signal proportional to light intensity where the beam scans, detection means receiving the output signal of said television camera tube and synchronized in its operation with said sweep means to start its output at the start of the sweep of said sweep means for indicating the reinforcements from the front and back surfaces of said transparent member during a raster sweep period.

8. A thickness determining device for continuously indicating the thickness of a transparent member comprising a light which, as detected, periodically varies in spectral frequency, the light being forwarded by way of two approximately aligned surfaces of said member, detection means repetitively responsive to said light during discrete periods of frequency variation thereof to generate an electrical signal representative of reinforcements, said light being received from both said surfaces, and output indicating means including means receiving the signal from said detecting means including electrical quantities representative of the light reinforcements from the front and back surfaces of said member, circuitry means for amplifying the electrical quantities representing said light reinforcements, means for integrating said quantities representing said reinforcements, and a voltage indicator means coupled to receive the output of said integrating means for measuring the value of such integration.

9. Apparatus for continuously determining the thickness of a transparent plastic tape layer on a moving tape, said layer having approximately parallel front and back surfaces, comprising a light source, a small aperture in the path of light source for passing a narrow light bear therefrom, a mirror arrangement including an oscillating diffracting mirror in the path of said narrow beam which divides said narrow beam into a light spectrum as reflected from said diffracting mirror, a second aperture positioned to receive a portion of the spectrum reflected from said diffracting mirror, a lens system for imaging said second aperture on said moving tape, light sensitive transducer means positioned to receive the light reflected from the front and back surfaces of said tape layer, and means for connecting a display means to said transducer means.

10. The apparatus as set forth in claim 9 including a partially reflecting mirror for directing the light from said second aperture upon said tape in a direction substantially perpendicular to said tape and for passing the light reflected substantially perpendicularly from said tape through said partially reflecting mirror to said light sensitive transducer means.

11. The apparatus as set forth in claim 9 further including a gear train for oscillating said diffracting mirror, including a crank mechanism adapted for rocking said mirror back and forth in a directional plane substantially coincident with the spectrum of said diffracting mirror and a motor for driving said gear train.

12. The apparatus of claim 11 further including switching means operated by said gear train in synchronism with the rocking of said diffracting mirror for providing electrical switching, and indicating means for receiving the output of said transducer, said display means being operatively synchronized by said electrical switching.

References Cited by the Examiner
UNITED STATES PATENTS

| 2,338,981 | 1/1944 | Straub | 88—14 |
| 2,425,758 | 8/1947 | Saunders | 88—14 |
| 2,845,838 | 8/1958 | Lindberg et al. | 88—14 |
| 2,882,787 | 4/1959 | Mitchell et al. | 88—14 |
| 2,948,185 | 8/1960 | Ward et al. | 88—14 |
| 3,062,965 | 11/1962 | Sick | 88—14 |

FOREIGN PATENTS 669,880    8/1929   France.

JEWELL H. PEDERSEN, *Primary Examiner.*